US012803065B2

(12) United States Patent
Sauerteig et al.

(10) Patent No.: US 12,803,065 B2
(45) Date of Patent: *Nov. 17, 2026

(54) BATTERY PACK, TREATMENT SYSTEM AND METHOD FOR THE PRODUCTION OF A BATTERY PACK

(71) Applicants: Andreas Stihl AG & Co. KG, Waiblingen (DE); Murata Manufacturing Co., Ltd., Nagaokakyo (JP)

(72) Inventors: Daniel Sauerteig, Kernen im Remstal (DE); Julien Scholl, Waiblingen (DE); Kenichi Ozawa, Koriyama (JP); Takayuki Sato, Koriyama (JP); Daiki Misawa, Koriyama (JP); Malte Von Hofen, Stuttgart (DE); Daniel Wagner, Winterbach (DE); Marcel Wilka, Boebingen (DE); Martin Schurr, Mutlangen (DE); Uwe Bossmann, Esslingen a. N. (DE); Dirk Liepold, Fellbach (DE)

(73) Assignees: Andreas Stihl AG & Co. KG, Waiblingen (DE); Murata Manufacturing Co., Ltd., Nagaokakyo (JP)

( * ) Notice: Subject to any disclaimer, the term of this patent is extended or adjusted under 35 U.S.C. 154(b) by 451 days.

This patent is subject to a terminal disclaimer.

(21) Appl. No.: 16/869,732

(22) Filed: May 8, 2020

(65) Prior Publication Data

US 2020/0358053 A1 Nov. 12, 2020

(30) Foreign Application Priority Data

May 10, 2019 (EP) .................................... 19173811

(51) Int. Cl.
*H01M 10/42* (2006.01)
*H01M 10/48* (2006.01)
(Continued)

(52) U.S. Cl.
CPC ....... *H01M 10/425* (2013.01); *H01M 10/658* (2015.04); *H01M 50/211* (2021.01);
(Continued)

(58) Field of Classification Search
CPC ............. H01M 50/211; H01M 50/519; H01M 50/284; H01M 10/0436;
(Continued)

(56) References Cited

U.S. PATENT DOCUMENTS

| | | | |
|---|---|---|---|
| 8,609,276 | B2 | 12/2013 | Han et al. |
| 10,249,918 | B2 | 4/2019 | Naito |

(Continued)

FOREIGN PATENT DOCUMENTS

| | | | |
|---|---|---|---|
| CN | 102369625 | A | 3/2012 |
| CN | 104904033 | A | 9/2015 |

(Continued)

OTHER PUBLICATIONS

Chinese-language Office Action issued in Chinese Application No. 202010382495.4 dated Aug. 28, 2023 with English translation (29 pages).

(Continued)

*Primary Examiner* — Miriam Stagg
*Assistant Examiner* — Lilia Nedialkova
(74) *Attorney, Agent, or Firm* — Crowell & Moring LLP

(57) ABSTRACT

A battery pack supplies an electrically driven treatment apparatus with an electric driving power. The battery pack includes: a plurality of pouch cells, wherein the pouch cells have cell tabs and are configured and disposed in a stack such that the cell tabs are disposed on a common tab side of (Continued)

the stack in two tab columns, wherein averted end limits of the tab columns define an intermediate zone, and a circuit board. The circuit board is disposed within the intermediate zone and is electrically connected to the cell tabs.

11 Claims, 13 Drawing Sheets

(51) Int. Cl.

| | |
|---|---|
| ***H01M 10/658*** | (2014.01) |
| ***H01M 50/211*** | (2021.01) |
| ***H01M 50/284*** | (2021.01) |
| ***H01M 50/516*** | (2021.01) |
| ***H01M 50/519*** | (2021.01) |
| ***H01M 50/55*** | (2021.01) |
| ***H01M 50/557*** | (2021.01) |
| ***H01M 50/566*** | (2021.01) |
| *H01M 50/224* | (2021.01) |

(52) U.S. Cl.
CPC ....... *H01M 50/284* (2021.01); *H01M 50/516* (2021.01); *H01M 50/519* (2021.01); *H01M 50/55* (2021.01); *H01M 50/557* (2021.01); *H01M 50/566* (2021.01); *H01M 2010/4271* (2013.01); *H01M 10/486* (2013.01); *H01M 50/224* (2021.01); *H01M 2220/30* (2013.01)

(58) Field of Classification Search
CPC . H01M 2010/4271; H01M 2010/4278; H01M 50/224; H01M 50/516; H01M 50/55; H01M 50/557; H01M 50/566; H01M 10/052; H01M 10/425; H01M 10/486; H01M 10/658; H01M 2220/30; Y02E 60/10; Y02P 70/50
See application file for complete search history.

(56) References Cited

U.S. PATENT DOCUMENTS

| | | | | |
|---|---|---|---|---|
| 2008/0233475 | A1 | 9/2008 | Kozu et al. | |
| 2010/0221584 | A1* | 9/2010 | Reber ................. | H01M 50/213 429/7 |
| 2011/0045335 | A1 | 2/2011 | Lee et al. | |
| 2012/0009462 | A1 | 1/2012 | Barter et al. | |
| 2012/0082881 | A1* | 4/2012 | Tsukamoto ............. | B60L 50/66 429/158 |
| 2012/0328908 | A1* | 12/2012 | Han .................... | H01M 50/296 429/7 |
| 2013/0216878 | A1* | 8/2013 | Merriman ........... | H01M 50/502 29/829 |
| 2014/0015535 | A1 | 1/2014 | Lopez | |
| 2015/0303415 | A1 | 10/2015 | Kayano et al. | |
| 2015/0380697 | A1 | 12/2015 | Osborne et al. | |
| 2016/0028056 | A1 | 1/2016 | Lee et al. | |
| 2016/0141728 | A1* | 5/2016 | Fauteux .............. | H01M 10/052 429/61 |
| 2016/0172656 | A1 | 6/2016 | Gaul et al. | |
| 2016/0197381 | A1 | 7/2016 | Kamada et al. | |
| 2016/0204481 | A1 | 7/2016 | Ryu | |
| 2016/0322673 | A1 | 11/2016 | Meintschel et al. | |
| 2017/0194674 | A1* | 7/2017 | Lee ..................... | H01M 50/572 |
| 2017/0365826 | A1 | 12/2017 | Varipatis et al. | |
| 2018/0040864 | A1 | 2/2018 | Rejman et al. | |
| 2018/0076487 | A1 | 3/2018 | Lee et al. | |
| 2018/0229621 | A1* | 8/2018 | Roh .................... | H01M 50/502 |
| 2018/0301913 | A1* | 10/2018 | Irish ........................ | H02J 7/007 |
| 2018/0361516 | A1* | 12/2018 | Kobayashi ............. | B23K 26/22 |
| 2020/0136121 | A1 | 4/2020 | Allen et al. | |
| 2021/0288370 | A1* | 9/2021 | Rejman ............... | H01M 50/247 |
| 2021/0320509 | A1 | 10/2021 | Irish et al. | |

FOREIGN PATENT DOCUMENTS

| | | | |
|---|---|---|---|
| CN | 105702905 | A | 6/2016 |
| CN | 107438911 | A | 12/2017 |
| CN | 206742438 | U | 12/2017 |
| CN | 107910485 | A | 4/2018 |
| CN | 109075578 | A | 12/2018 |
| DE | 10 2015 000 142 | A1 | 7/2015 |
| DE | 10 2016 203 424 | A1 | 9/2016 |
| EP | 2 538 469 | A2 | 12/2012 |
| EP | 2 645 450 | A1 | 10/2013 |
| JP | 2015-46311 | A | 3/2015 |
| JP | 2016-35876 | A | 3/2016 |
| JP | 2016-539474 | A | 12/2016 |
| JP | 2019-502229 | A | 1/2019 |
| KR | 10-2010-0066712 | A | 6/2010 |
| KR | 10-2015-0062777 | A | 6/2015 |
| KR | 10-2015-0070511 | A | 6/2015 |
| WO | WO 2014/189272 | A1 | 11/2014 |
| WO | WO 2018/195218 | A1 | 10/2018 |

OTHER PUBLICATIONS

Japanese-language Office Action issued in Japanese Application No. 2020-081682 dated May 21, 2024 with English translation (19 pages).

* cited by examiner a)

BATTERY PACK, TREATMENT SYSTEM AND METHOD FOR THE PRODUCTION OF A BATTERY PACK

FIELD OF APPLICATION AND PRIOR ART

The invention relates to a battery pack for supplying an electrically driven treatment apparatus with electric driving power, to a treatment system including such a battery pack and an electrically driven treatment apparatus and to a method for the production of a battery pack for supplying an electrically driven treatment apparatus with electric driving power.

PROBLEM AND SOLUTION

The invention is based on the problem of providing a battery pack for supplying an electrically driven treatment apparatus with electric driving power, a treatment system including such a battery pack and an electrically driven treatment apparatus, and a method for the production of a battery pack for supplying an electrically driven treatment apparatus with electric driving power, wherein the battery pack and the method each have improved properties.

The invention solves the problem by providing a battery pack, by providing a treatment system, and by providing a method, according to the claimed invention. Advantageous developments of the invention are described and claimed herein.

The battery pack according to the invention is designed or configured for supplying, in particular automatic supplying, of an electrically driven treatment apparatus, in particular a treatment apparatus gardening, forestry and/or building construction, with electric driving power. The battery pack includes a plurality of pouch cells and a circuit board. The pouch cells have cell tabs and are designed or configured and disposed in a stack such that the cell tabs, in particular all of the cell tabs, are disposed, in particular only, on a common tab side, in particular a single common tab side, of the stack in two tab columns, in particular exactly two tab columns. Averted or remote end limits of the tab columns define or delimit an intermediate zone. The circuit board is disposed, in particular completely and/or only, within the intermediate zone and is electrically connected to the cell tabs.

This allows a relatively compact structure of the battery pack. At the same time, this allows that the tab columns, in time after arrangement of the circuit board, can still be relatively easily accessible from the outside, and thus a relatively simple production of the battery pack.

In particular, the pouch cells can be configured for supplying the treatment apparatus with the driving power. In addition or as an alternative, the pouch cells can be accumulator cells or battery cells, or can be in each case individual rechargeable storage elements for electric energy working on an electrochemical basis. In particular, the pouch cells can be lithium-ion accumulator cells. Further in addition or as an alternative, the pouch cells can be electrically interconnected, in particular can be connected in series or in parallel. In particular, the cell tabs, in particular in each case, of next pouch cells can be electrically interconnected. Further in addition or as an alternative, the pouch cells can be flat cells. Further in addition or as an alternative, a surface of the pouch cells can be rectangular. Further in addition or as an alternative, the pouch cells can be similar or identical, in particular of the same type and/or the same construction.

The pouch cells can be disposed in the stack one on top of the other or superimposed. In addition or as an alternative, the stack can be cuboid in shape, and in particular, the tab side can be a side of the cuboid.

The cell tabs can be referred to as contact tabs, cell contacts, terminals, poles or connector electrodes. Further in addition or as an alternative, the pouch cells, in particular in each case, can have the cell tabs on a same border or a same edge, in particular an outer shell or cell shell of the pouch cell. Further in addition or as an alternative, the cell tabs of the pouch cells, in particular of a respective one of the pouch cells, and thus the tab columns can be spaced from each other. In other words: the pouch cells can each have two cell tabs spaced from each other and be configured and disposed in the stack such that cell tabs of different pouch cells can be disposed in a first one of the tab columns and other cell tabs of different pouch cells can be disposed in a second one of the tab columns, wherein the first tab column and the second tab column can spaced from each other. Further in addition or as an alternative, the tab columns can be referred to as tab rows. Further in addition or as an alternative, the tab columns can be or extend in parallel to each other.

The circuit board can be disposed on the tab side on the stack. In particular, on the stack can mean that the circuit board can be disposed spaced from the stack at a maximum of 20 millimeters (mm), in particular a maximum of 10 mm, in particular a maximum of 5 mm. In addition or as an alternative, the circuit board does not need to reach up to the averted end limits. Further in addition or as an alternative, the circuit board can be disposed between the tab columns, in particular between facing or close end limits of the tab columns. Further in addition or as an alternative, the circuit board can leave the tab columns, in particular in each case, at least partially exposed or uncovered.

In a development of the invention, the circuit board is disposed with a board plane parallel to the tab side. In particular, the board plane corresponds to a tab plane defined by the tab columns. This allows a specifically compact structure of the battery pack. At the same time, this allows that the circuit board can be specifically close to the cell tabs. In particular, the cell tabs with tab parts can extend in parallel to the tab side, and the tab parts can define the tab plane. In particular, the circuit board can be electrically connected to the tab parts.

In a development of the invention, the circuit board holds measuring electronics. The measuring electronics are designed or configured for measuring, in particular automatic measuring, of voltages, in particular electrical voltages, of the pouch cells, in particular all of the pouch cells. This feature allows detecting of safety-critical conditions of the pouch cells. In particular, the voltages can be medium voltages.

In a development of the invention, electrical connections, in particular electrical cell connectors, between the circuit board, in particular the measuring electronics, where present, and a number of the cell tabs are identical, in particular are short. This allows an equal effect by the electrical connections, if at all, in particular on the voltage measurements, where present. In particular, the electrical connections can be disposed in two connector columns. In particular, the connector columns can be or extend in parallel to each other and/or to the tab columns.

In a development of the invention, the circuit board, in particular the measuring electronics, where present, is/are electrically connected to a number of the cell tabs by means of electrical cell connectors, in particular the electrical cell connectors. The cell connectors are inflexible. This allows, in particular in case the cell connectors are connected, in particular mechanically connected, with a respective end to the circuit board, in time before arrangement of the circuit board within the intermediate zone, that the cell connectors can be positioned with a respective other end to the cell tabs, in time after arrangement. This can allow a relatively facilitated electrical connecting of the circuit board to the cell tabs. In particular, the cell connectors do not need to be cables. In addition or as an alternative, the electrical cell connectors can be disposed in two connector columns. In particular, the connector columns can be or extend in parallel to each other and/or to the tab columns.

In a development of the invention, the circuit board is electrically connected to a number of the cell tabs by means of electrical cell connectors, in particular the electrical cell connectors. The cell connectors protrude or project, in particular in each case, beyond a board edge of the circuit board, in particular in the direction of at least one of the end limits of the tab columns. This allows that the cell connectors can reach up to the cell tabs. In particular, the electrical cell connectors can be disposed in two connector columns. In particular, the connector columns can be or extend in parallel to each other and/or to the tab columns.

In a development of the invention, the circuit board is electrically connected, and in particular mechanically connected, to a number of the cell tabs, in particular in each case, by a material-bonding engagement, in particular by a welded connection.

In addition or as an alternative, the cell tabs, in particular in each case, of next pouch cells are electrically connected, and in particular mechanically connected, to each other, in particular directly, by a material-bonding engagement, in particular by a welded connection.

In addition or as an alternative, the battery pack has a stack limiting structure, in particular a stack housing. The stack limiting structure has a first structural part, in particular housing part, and a second structural part, in particular housing part. The stack is arranged between the first structural part and the second structural part. The first structural part and the second structural part are mechanically connected to each other, in particular directly, by at least one material-bonding engagement, in particular by a welded connection.

In addition or as an alternative, the battery pack has at least one electric power connector. The electric power connector is electrically connected, and in particular mechanically connected, in particular directly, to one of the cell tabs by a material-bonding engagement, in particular by a welded connection.

Arrangement of the circuit board within the intermediate zone allows that, in time after arrangement of the circuit board, the circuit board to the number of cell tabs, the cell tabs to each other, the first structural part and the second structural part to each other and/or the power connector to the cell tab are connected or can be connected in a production step, in particular only, in particular a single and/or a common production step, by the, in particular respective, material-bonding engagement.

In particular, the electrical cell connectors, where present, can be connected to the number of the cell tabs, in particular in each case, by the material-bonding engagement. In addition or as an alternative, the stack housing can be massive and/or cuboid in shape. Further in addition or as an alternative, the stack limiting structure can partially or even completely be made of aluminum. Further in addition or as an alternative, the welded connection can be a laser welded connection or an ultrasonic welded connection.

In a development of the invention, the battery pack has a stack limiting structure, in particular the stack limiting structure, in particular a stack housing. The stack limiting structure has a structure opening, in particular a common structure opening, defined by a structure edge, in particular of the stack limiting structure. The pouch cells are designed or configured and disposed in the stack within the stack limiting structure such that, in particular all of, the cell tabs at least with tab parts, in particular in each case, on the structure opening project beyond at least one edge portion of the structure edge, in particular through the structure opening to the outside. The circuit board is electrically connected to the tab parts.

In addition or as an alternative, the battery pack has a stack limiting structure, in particular the stack limiting structure, in particular a stack housing, comprising a structure opening, in particular the structure opening, in particular common structure opening, and a frame. The stack is disposed within the stack limiting structure. The cell tabs, in particular all of the cell tabs, are disposed on the structure opening. The frame supports the circuit board and is disposed on the structure opening. The cell tabs, in particular all of the cell tabs, and the circuit board are positioned in relation to each other, in particular fixed, by means of the stack limiting structure and the frame.

The projection of the tab parts allows that, in time after arrangement of the pouch cells in the stack within the stack limiting structure, the tab parts are connected or can be connected to the circuit board, to each other and/or to the electric power connector, where present, by material-bonding engagement, in particular the respective material-bonding engagement, where present, in a relatively simple manner.

The stack limiting structure and the frame allow relatively simple positioning.

In particular, the stack housing can be massive and/or cuboid in shape. In addition or as an alternative, the stack limiting structure can partially or even completely be made of aluminum. Further in addition or as an alternative, the structure edge can define an opening plane of the structure opening. The opening plane can be or extend in parallel to the tab side. Further in addition or as an alternative, the tab parts can be or can extend in parallel to the tab side and/or to the opening plane. Further in addition or as an alternative, the tab parts can be, in particular completely and/or only, disposed outside the stack limiting structure. Further in addition or as an alternative, the pouch cells with outer shells or cell shells can be disposed, in particular completely and/or only, in the stack within the stack limiting structure. Further in addition or as an alternative, the frame can be composed partially or even completely of synthetic material.

In a development of the invention, the battery pack comprises a further circuit board. The further circuit board is disposed on the tab side farther remote from the stack than the circuit board, in particular with a further board plane parallel to the tab side.

The further circuit board is wider than the tab columns.

In addition or as an alternative, the further circuit board holds power electronics. The power electronics are designed or configured for controlling, in particular automatic controlling, in particular stopping, of the output of electric driving power from the battery pack and/or an input of electric charging power to the battery pack, in particular in response to the measured voltages, where present.

The width allows a relative great distance between a low side and a high side of the further circuit board.

The power electronics allow safety-critical conditions of the pouch cells, and thus of the battery pack, to be kept low or even prevented completely. In addition or as an alternative, the remote arrangement of the further circuit board allows an effect of heat of the power electronics on the pouch cells to be kept low or even prevented completely, and/or a relatively efficient dissipation of heat to the outside. Further in addition or as an alternative, the remote arrangement of the further circuit board allows an effect of relatively high electric currents of the power electronics on the measuring electronics, where present, to be kept low or even prevented completely.

In particular, the further circuit board can be disposed outside the intermediate zone and/or project or protrude beyond the averted end limits of the tab columns. In addition or as an alternative, the width of the further circuit board can correspond to a width of the stack, in particular be identical. Further in addition or as an alternative, the low side of the further circuit board can be disposed at a first one of the tab columns and the high side of the further circuit board can be disposed at a second one of the tab columns.

In a development of the invention, the battery pack comprises a further circuit board, in particular yet another further circuit board. The further circuit board, in particular the yet another further circuit board, is disposed on the tab side farther remote than the circuit board, and in particular than the further circuit board, where present, from the stack, in particular with a further board plane, in particular yet another further board plane, parallel to the tab side. The further circuit board, in particular yet another further circuit board, holds user interface electronics and/or transmission electronics. The user interface electronics are designed or configured for interaction, in particular automatic interaction, with a user. The transmission electronics are designed or configured for wireless transmission, in particular automatic wireless transmission, of at least one operating parameter and/or operating condition. The remote arrangement of the further circuit board, in particular yet another further circuit board, allows relatively easy accessibility of the user interface electronics from the outside and/or relatively good transmission of the transmission electronics from and/or to the outside. In particular, the user interface electronics can be configured for output of a charging condition of the battery pack. In addition or as an alternative, the transmission electronics can be configured for unidirectional or bidirectional transmission of the at least one operating parameter and/or operating condition.

In a development of the invention, the circuit board has a recess, in particular a through hole. The recess is configured for passing a sensor line, for a flow of casting compound and/or for positioning the at least one circuit board. In particular, the sensor line can be from a temperature sensor for measuring a temperature of the pouch cells and/or a pressure sensor for detecting, in particular measuring, a pressure of the pouch cells. The casting compound can be a protection of the circuit board, and in particular of the cell tabs, against moisture and/or mechanical stress and/or allow heat dissipation.

In a development of the invention, the battery pack has, in particular the accumulator cells have, a maximum electric driving power of a minimum of 1 kilowatt (kW), in particular a minimum of 2 kW, and/or of a maximum of 10 kW, in particular a maximum of 5 kW.

In addition or as an alternative, the battery pack has, in particular the pouch cells have, a nominal voltage, in particular an electrical nominal voltage, of a minimum of 10 Volts (V), in particular a minimum of 20 V, and/or of a maximum of 100 V, in particular a maximum of 50 V.

In addition or as an alternative, the battery pack has, in particular the pouch cells have, a maximum energy content, in particular an electrical maximum energy content, of a minimum of 100 Watt hours (Wh), in particular a minimum of 200 Wh, and/or of a maximum of 1000 Wh, in particular a maximum of 500 Wh.

In addition or as an alternative, the battery pack has a mass of a minimum of 0.5 kilograms (kg), in particular a minimum of 1 kg, and/or of a maximum of 10 kg, in particular a maximum of 5 kg.

In addition or as an alternative, the battery pack has a height of a minimum of 2.5 centimeters (cm) and/or of a maximum of 10 cm, and/or a width of a minimum of 5 cm and/or of a maximum of 20 cm, and/or a depth of a minimum of 7.5 cm and/or of a maximum of 30 cm.

The treatment system according to the invention includes a battery pack, in particular the battery pack, as described above and an electrically driven treatment apparatus, in particular the electrically driven treatment apparatus. The battery pack and the treatment apparatus are designed or configured for electrical connection with each other for supplying, in particular automatic supplying, of the treatment apparatus with electric driving power from the battery pack.

In particular, the treatment system can be a treatment system for gardening, forestry and/or building construction. In addition or as an alternative, the treatment apparatus can be a treatment apparatus for gardening, forestry and/or building construction. Further in addition or as an alternative, the treatment apparatus can be a hand-guided, in particular floor-guided or hand-held, treatment apparatus. In particular hand-guided, in particular hand-held, treatment apparatus can mean that the treatment apparatus can have a maximum mass of 50 kilograms (kg), in particular of 20 kg, in particular of 10 kg. Further in addition or as an alternative, the treatment apparatus can include an electric drive motor. Further in addition or as an alternative, the battery pack and the treatment apparatus can be configured for detachable electrical connection with each other, in particular without using a tool and/or without destruction, particularly by using plug connectors. Further in addition or as an alternative, the battery pack and the treatment apparatus can be configured for, in particular detachable, mechanical connection with each other, in particular without using a tool and/or detachable without destruction. In particular, the treatment apparatus can be configured for holding the battery pack.

In a development of the invention, the treatment apparatus has a battery accommodation, in particular a battery compartment. The battery accommodation is designed or configured for accommodating the battery pack.

In a development of the invention, the treatment apparatus is a saw, a pole pruner, a clearing saw, a brush cutter, hedge shears, a hedge cutter, a blower device, a leaf blower, a lopper, a cutoff grinder, a sweeper device, a sweeper roller, a sweeper brush, a lawn mower, a dethatcher or a grass trimmer.

The method according to the invention for the production of a battery pack, in particular the battery pack, in particular as described above, for supplying an electrically driven treatment apparatus, in particular the electrically driven treatment apparatus, with an electric driving power comprises the steps:

a) disposing a plurality of pouch cells, in particular the plurality of pouch cells, in a stack, in particular the stack, wherein the pouch cells have cell tabs, in particular the cell tabs, and are configured such that the cell tabs are disposed on a common tab side, in particular the common tab side, of the stack in two tab columns, in particular the two tab columns, wherein averted end limits, in particular the averted end limits, of the tab columns define an intermediate zone, in particular the intermediate zone. b) disposing a circuit board, in particular the circuit board, within the intermediate zone, in particular in time after step a). c) electrically connecting the circuit board to the cell tabs, in particular in time after step b).

The method can allow the same advantages as the battery pack described above.

In particular, the circuit board can be electrically connected to the cell tabs by means of electrical cell connectors, in particular the electrical cell connectors.

In a development of the invention, the step b) is performed in time after step a). The step c) is performed in time after step b) and comprises: material-bonding engagement, in particular welding, of the circuit board to a number of the cell tabs, in particular in each case, for electrical connecting, and in particular mechanical connecting, of the circuit board to the cell tabs and material-bonding engagement, in particular welding, of the cell tabs, in particular in each case, of next pouch cells for, in particular direct, electrical connecting, and in particular mechanical connecting, of the cell tabs of next pouch cells to each other. This is allowed by the arrangement of the circuit board within the intermediate zone. In particular, the electrical cell connectors, where present, can be connected to the number of the cell tabs, in particular in each case, by material-bonding engagement. In addition or as an alternative, the welding can be laser welding or ultrasonic welding.

BRIEF DESCRIPTION OF THE DRAWINGS

Further advantages and aspects of the invention can be gathered from the claims and from the following description of preferred exemplary embodiments of the invention, which will be explained hereinbelow with reference to the figures. Therein:

DETAILED DESCRIPTION OF THE EXEMPLARY EMBODIMENTS

FIGS. 1 to 14 show a battery pack 1 for supplying an electrically driven treatment apparatus 101 with an electric driving power AL and a method for the production of the battery pack 1 for supplying the electrically driven treatment apparatus 101 with an electric driving power AL.

Figure 5:
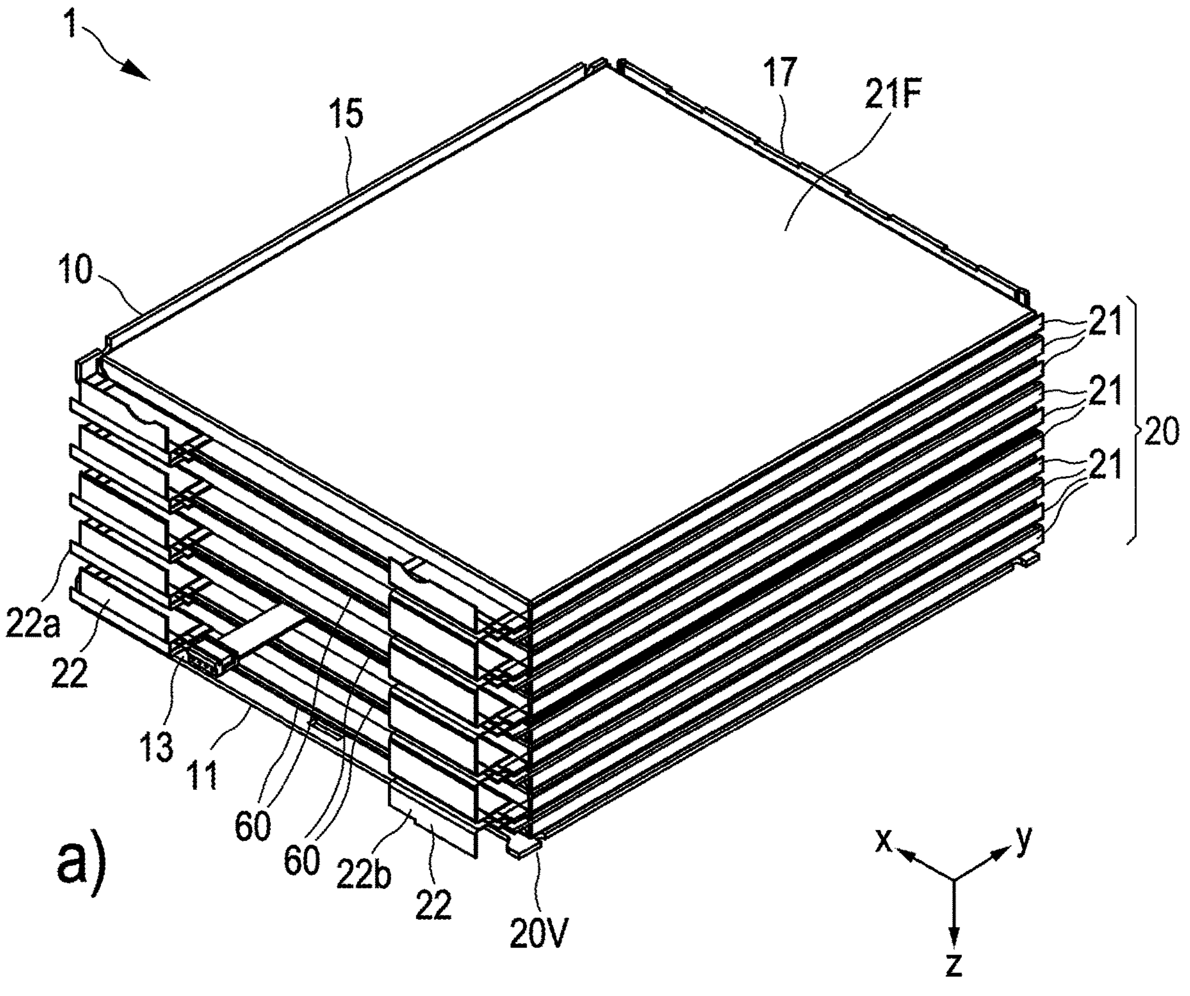
FIG. 5 shows a perspective view of the first structural part, of pouch cells, the pressure sensor and the inner temperature sensor disposed in a stack of the battery pack from FIG. 1 and the method.
Figure 6:
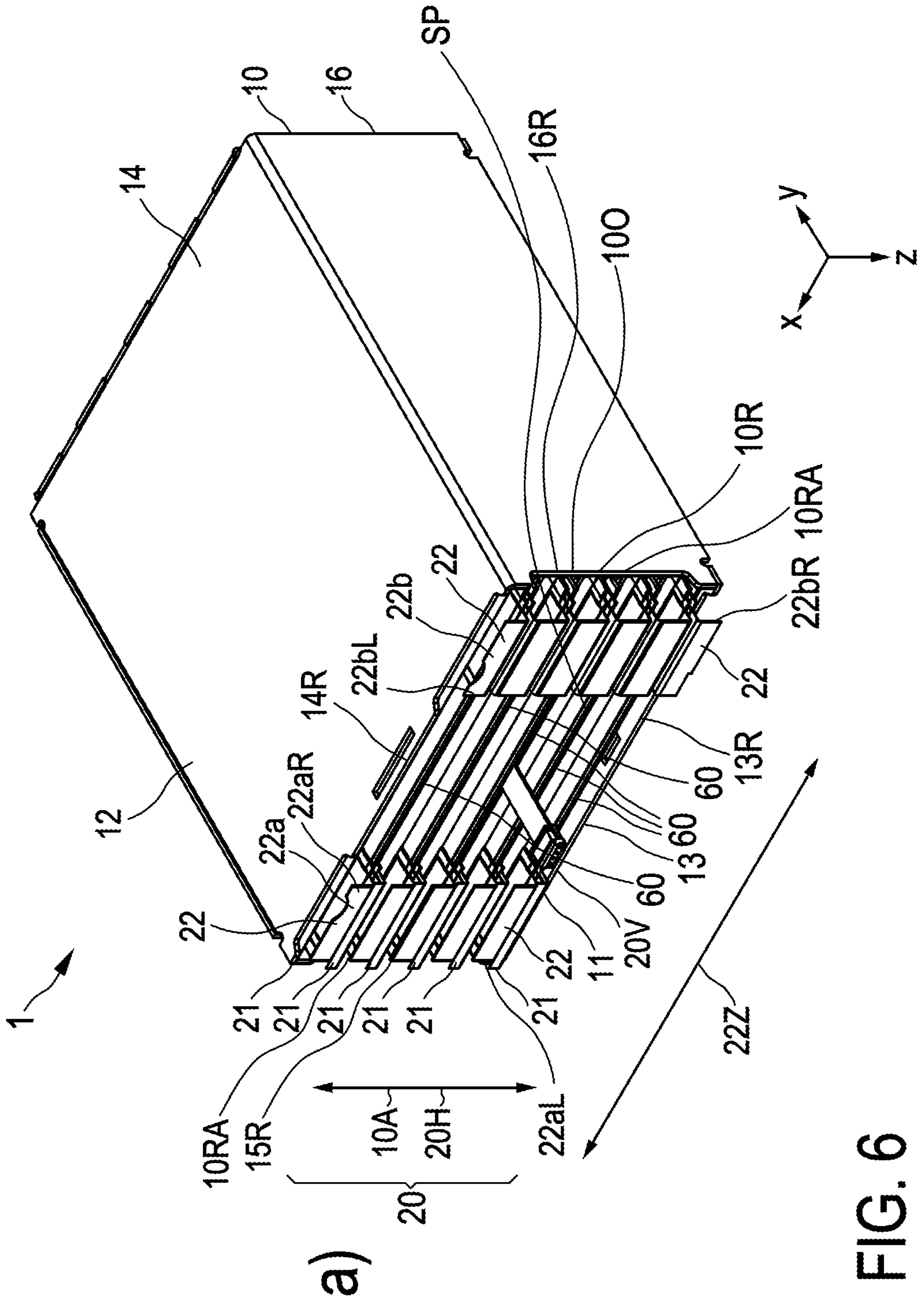
FIG. 6 shows a perspective view of the first structural part, the stack and a second structural part of the stack limiting structure of the battery pack from FIG. 1 and the method.
Figure 7:
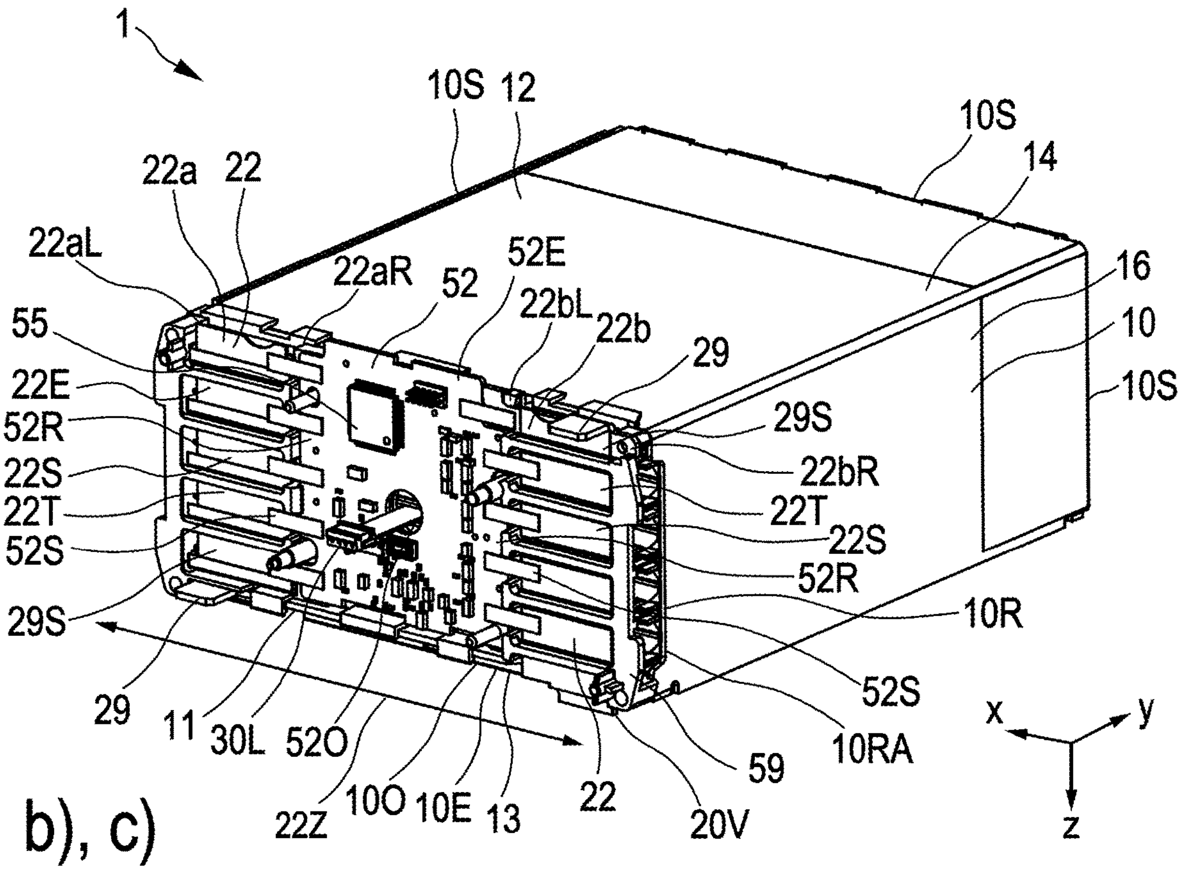
FIG. 7 shows a perspective view of the first structural part, the stack, the second structural part and a circuit board of the battery pack from FIG. 1 and a method.

The battery pack 1 comprises a plurality of pouch cells 21 and a circuit board 52, as illustrated in FIGS. 5 to 7. The pouch cells 21 have cell tabs 22 and are configured and disposed in a stack 20 such that the cell tabs 22 are disposed on a common tab side, in particular front side, 20V of the stack 20 in two tab columns 22*a*, 22*b*. Averted end limits 22*a*L, 22*b*R of the tab columns 22*a*, 22*b* define an intermediate zone 22Z. The circuit board 52 is disposed within the intermediate zone 22Z and is electrically connected to the cell tabs 22.

The method comprises the steps: a) disposing the plurality of pouch cells 21 in a stack 20, wherein the pouch cells 21 have the cell tabs 22 and are configured such that the cell tabs 22 are disposed on the common tab side 20V of the stack 20 in the two tab columns 22*a*, 22*b*, wherein the averted end limits 22*a*L, 22*b*R of the tab columns 22*a*, 22*b* define the intermediate zone 22Z. b) disposing the circuit board 52 within the intermediate zone 22Z. c) electrically connecting the circuit board 52 to the cell tabs 22.

In the exemplary embodiment shown, the battery pack 1 includes ten pouch cells 21. In alternative exemplary embodiments, the battery pack can include at least two pouch cells.

Furthermore, in the exemplary embodiment shown, the pouch cells 21 in the stack 20 are disposed in a stack direction z. Moreover, in the exemplary embodiment shown, the pouch cells 21 respectively extend in directions x, y orthogonal to the stack direction z.

Further, in the exemplary embodiment shown, the tab columns 22*a*, 22*b* are or extend in the stack direction z. Additionally, in the exemplary embodiment shown, the averted end limits 22*a*L, 22*b*R of the tab columns 22*a*, 22*b* define or delimit the intermediate zone 22Z in the direction x, −x orthogonal to the stack direction z.

Furthermore, in the exemplary embodiment shown, the circuit board 52 is disposed between the tab columns 22*a*, 22*b*, in particular between facing end limits 22*a*R, 22*b*L of the tab columns 22*a*, 22*b*. Moreover, in the exemplary embodiment shown, the circuit board 52 is disposed on the tab side, in particular front side, 20V on the stack 20.

In detail, the circuit board 52 is disposed with a board plane 52E in parallel to the tab side 20V. In particular, the board plane 52E corresponds to a tab plane 22E defined by the tab columns 22*a*, 22*b*.

Furthermore, the circuit board 52 holds measuring electronics 55. The measuring electronics 55 are configured for measuring voltages SP of the pouch cells 21.

Moreover, electrical connections 52*e*V', in particular electrical cell connectors 52*e*V", between the circuit board 52, in particular the measuring electronics 55, and a number of the cell tabs 22 are identical, in particular are short.

Further, the circuit board 52, in particular the measuring electronics 55, is/are electrically connected to the number of the cell tabs 22 by means of electrical cell connectors 52*e*V".

The cell connectors 52*e*V" are inflexible.

In particular, the cell connectors 52*e*V" are connected, in particular mechanically connected, with a respective end to the circuit board 52 in time before step b). Thus, the cell connectors 52*e*V" are positioned with a respective other end on the cell tabs 22 in time after step b) and in time before step c).

Additionally, the cell connectors 52*e*V", in particular in each case, project beyond a board edge 52R of the circuit board 52, in particular in the direction x, −x orthogonal to the stack direction z, of at least one of the end limits 22*a*L, 22*b*R of the tab columns 22*a*, 22*b*.

Furthermore, the circuit board 52, in particular the electrical cell connectors 52*e*V", is/are electrically connected to the number of the cell tabs 22, in particular in each case, by material-bonding engagement 52S, in particular by a welded connection.

In addition, the cell tabs 22, in particular in each case, of next pouch cells 21 are electrically connected to each other, in particular directly, by a material-bonding engagement 22S, in particular by a welded connection.

Figure 3:
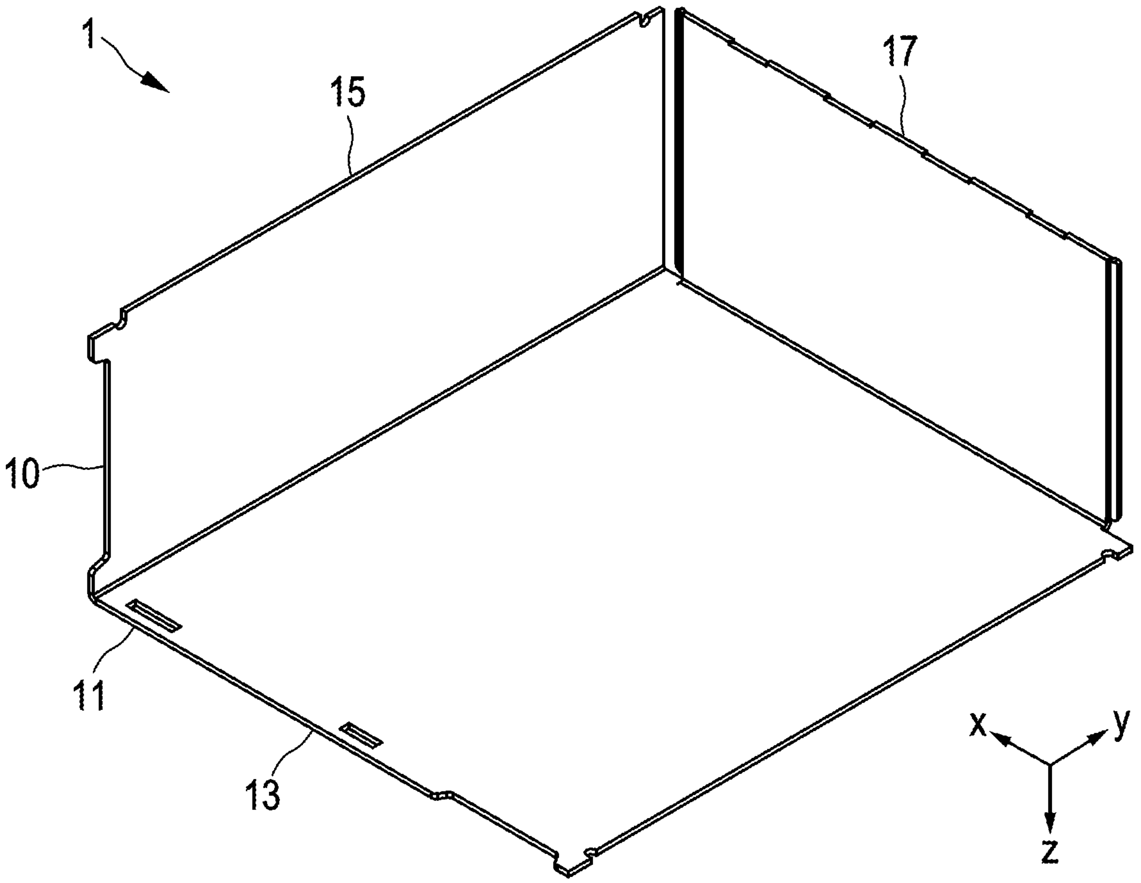
FIG. 3 shows a perspective view of a first structural part of a stack limiting structure of the battery pack from FIG. 1.

In addition, the battery pack 1 has a stack limiting structure 10, in particular a stack housing. The stack limiting structure 10 has a first structural part 11, as illustrated in FIG. 3, and a second structural part 12, as illustrated in FIG. 6. The stack 20 is disposed between the first structural part 11 and the second structural part 12. The first structural part 11 and the second structural part 12 mechanically connected to each other, in particular directly, by at least one material-bonding engagement 10S, in particular by a welded connection, as illustrated in FIG. 7.

In addition, the battery pack 1 has at least one electric power connector 29, in the exemplary embodiment shown, two power connectors 29. The electric power connector 29 is electrically connected, in particular directly, to one of the cell tabs 22 by a material-bonding engagement 29S, in particular by a welded connection.

The step b) is performed in time after step a). The step c) is performed in time after step b) and comprises: material-bonding engagement, in particular welding, of the circuit board 52, in particular the electrical cell connectors 52*e*V", to the number of the cell tabs 22, in particular in each case, for electrical connecting of the circuit board 52, in particular the electrical cell connectors 52*e*V", to the cell tabs 22, and material-bonding engagement, in particular welding, of the cell tabs 22, in particular in each case, of next pouch cells 21 for, in particular direct, electrical connecting of the cell tabs 22 of next pouch cells 21 to each other.

In the exemplary embodiment shown, the pouch cells 21 are connected in series, in particular in the stack direction z.

Moreover, in the exemplary embodiment shown, the step a) comprises: disposing the stack 20 between the first structural part 11 and the second structural part 12. The step c) comprises: material-bonding engagement, in particular welding, of the first structural part 11 and the second structural part 12 for, in particular direct, mechanical connecting of the first structural part 11 and the second structural part 12 to each other.

In particular, in the exemplary embodiment shown, the first structural part 11 has a first structure or housing wall 13. The second structural part 12 has a second structure or housing wall 14. The second structure or housing wall 14 is disposed opposite to the first structure or housing wall 13 with a fixed distance 10A, in particular in the stack direction z, as illustrated in FIG. 6. The stack 20 is disposed between the first structure or housing wall 13 and the second structure or housing wall 14. A height 20H of the stack 20, in particular in the stack direction z, is limited by the first structure or housing wall 13 and the second structure or housing wall 14, in particular with their fixed distance 10A.

The step a) comprises: disposing the stack 20 on the first structure or housing wall 13 and in time after disposing the second structure or housing wall 14 on the stack 20 such that the second structure or housing wall 14 is disposed opposite to the first structure or housing wall 13 with the fixed distance 10A, that the stack 20 is disposed between the first structure or housing wall 13 and the second structure or housing wall 14 and the height 20H of the stack 20, in particular in the stack direction z, is limited by the first structure or housing wall 13 and the second structure or housing wall 14.

In detail, in the exemplary embodiment shown, the first structure or housing wall 13 and the second structure or housing wall 14 each extend in the directions x, y orthogonal to the stack direction z. In other words: the second structure or housing wall 14, in particular with a main plane, is disposed parallel to the first structure or housing wall 13, in particular a main plane of the first structure or housing wall 13. Further, in the exemplary embodiment shown, the distance 10A is in the stack direction z. Moreover, in the exemplary embodiment shown, the height 20H is equal to the distance 10A.

Furthermore, in the exemplary embodiment shown, the step b) comprises: disposing of the at least one electric power connector 29 on the cell tab 22. The step c) comprises: material-bonding engagement, in particular welding, of the electric power connector 29 to the cell tab 22 for, in particular directly, electrical connecting of the power connector 29 to the cell tab 22.

Moreover, the stack limiting structure 10 has a structure opening 100, in particular a common structure opening 100, defined by a structure edge 10R, as illustrated in FIG. 7. The pouch cells 21 are configured and disposed in the stack 20 within the stack limiting structure 10 such that the cell tabs 22, at least with tab parts 22T, in particular in each case, on the structure opening 10O project beyond at least one edge portion 10RA of the structure edge 10R, in particular through the structure opening 10O to the outside. The circuit board 52, in particular the electrical cell connectors 52*e*V", is/are electrically connected to the tab parts 22T, in particular a number of the tab parts 22T.

In addition, the battery pack 1 has a frame 59. The cell tabs 22, in particular with the tab parts 22T, are disposed on the structure opening 10O. The frame 59 supports the circuit board 52, and in particular the electrical cell connectors 52*e*V", and is disposed on the structure opening 10O. The cell tabs 22, in particular the tab parts 22T, and the circuit board 52, in particular the electrical cell connectors 52*e*V", are positioned in relation to each other by means of the stack limiting structure 10 and the frame 59.

In the exemplary embodiment shown, the tab parts 22T, in particular in each case, of next pouch cells 21 are electrically connected, in particular directly, to each other by the material-bonding engagement 22S, in particular the welded connection.

The step a) comprises: disposing the plurality of pouch cells 21 such in the stack 20 within the stack limiting structure 10, wherein the stack limiting structure 10 has the structure opening 10O defined by the structure edge 10R, wherein the pouch cells 21 are configured such that the cell tabs 22 at least with the tab parts 22T on the structure opening 10O project beyond at least one edge portion 10RA of the structure edge 10R. The step c) comprises: material-bonding engagement, in particular welding, of the circuit board 52, in particular the electrical cell connectors 52*e*V", to the number of the tab parts 22T, in particular in each case, for electrical connecting of the circuit board 52, in particular the electrical cell connectors 52*e*V", to the tab parts 22T and material-bonding engagement, in particular welding, of the tab parts 22T, in particular in each case, of next pouch cells 21, for electrical connecting, in particular directly, of the tab parts 22T of next pouch cells 21 to each other.

In the exemplary embodiment shown, the electric power connector 29 is electrically connected, in particular directly, to one of the tab parts 22T by the material-bonding engagement 29S, in particular the welded connection.

The step b) comprises: disposing of the at least one electric power connector 29 on the tab part 22T. The step c) comprises: material-bonding engagement, in particular welding, of the electric power connector 29 to the tab part 22T for electrical connecting, in particular directly, of the electric power connector 29 to the tab part 22T.

Further, in the exemplary embodiment shown, the step a) comprises: disposing of the stack 20 such within the stack limiting structure 10 that the cell tabs 22, in particular with the tab parts 22T, are disposed on the structure opening 10O. The step b) comprises: disposing the frame 59 on the structure opening 10O such that the cell tabs 22, in particular the tab parts 22T, and the circuit board 52, in particular the electrical cell connectors 52*e*V", are positioned in relation to each other by means of the stack limiting structure 10 and the frame 59.

In particular, in the exemplary embodiment shown, the structure edge 10R defines an opening plane 10E, in particular an opening plane parallel to the tab side 20V, of the structure opening 10O. The tab parts 22T extend, in particular only, in parallel to the opening plane 10E.

Figure 8:
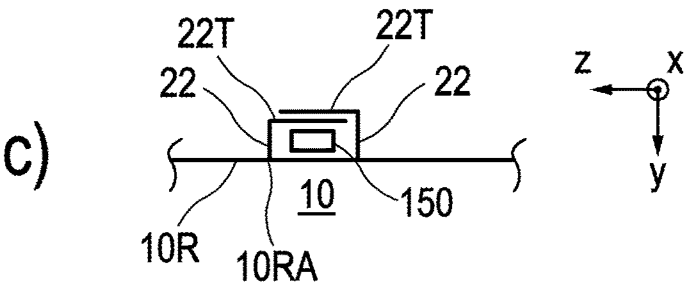
FIG. 8 shows a lateral view of the stack limiting structure and of cell tabs with tab parts of the pouch cells of the battery pack from FIG. 1 and a welding base and the method.

In the exemplary embodiment shown, the step c) comprises: disposing a welding base 150, in particular a welding anvil, at least partially between at least one of the tab parts 22T, in particular tab parts 22T extending in parallel, and the edge portion 10RA, in particular in parallel to the tab part 22T, and welding the tab part 22T using the welding base 150, as illustrated in FIG. 8.

Moreover, in the exemplary embodiment shown, the electric power connector 29 is disposed at least partially between the tab part 22T, in particular the tab part 22T extending in parallel, and the edge portion 10RA, in particular in parallel to the tab part 22T.

Furthermore, in the exemplary embodiment shown, the electrical cell connectors 52*e*V" are farther remote than the tab parts 22T, in particular the number of tab parts 22T, from the stack 20 or outer shells of the pouch cells 21.

In detail, in the exemplary embodiment shown, the tab parts 22T are parts of the cell tabs 22, in particular parts of the cell tabs 22 bent from the direction−y to the direction z,−z, and project, in particular in each case, beyond a next or adjacent edge portion 10RA, in particular in each case, in prolongation of a bending axis of the cell tabs 22.

Moreover, in the exemplary embodiment shown, the stack limiting structure 10 or the stack housing 10 is cuboid in shape and has at least four, in the exemplary embodiment shown, five structure or housing walls 13, 14, 15, 16, 17. Wall edges 13R, 14R, 15R, 16R of four of the structure or housing walls 13, 14, 15, 16 define the structure opening 10O, in particular on the peripheral side, as illustrated in FIG. 6.

In the exemplary embodiment shown, the first structural part 11 has the first structure or housing wall or top side wall 13, the structure or housing wall, in particular the peripheral side wall, 15 and the structure or housing wall, in particular the rear side wall, 17. The second structural part 12 has the second structure or housing wall or bottom side wall 14 and the structure or housing wall, in particular the peripheral side wall, 16.

Figure 9:
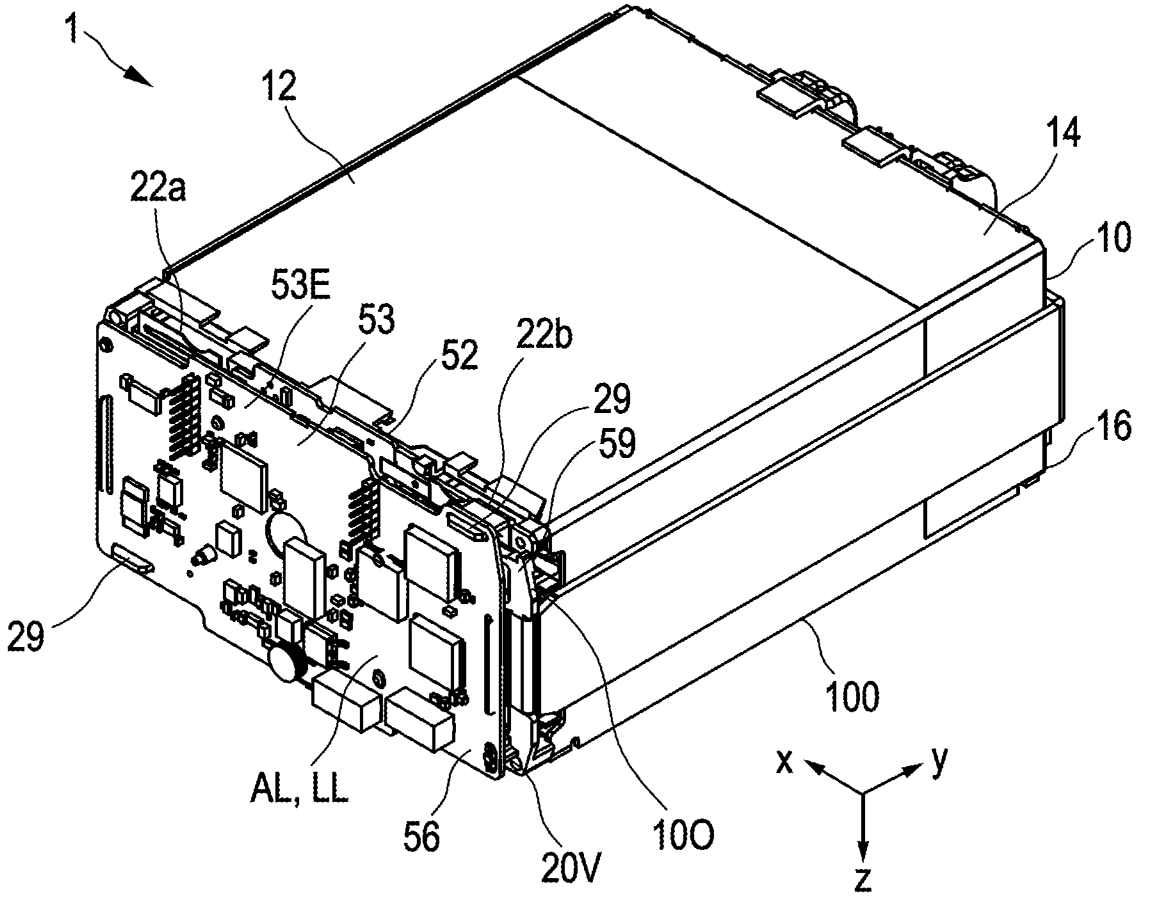
FIG. 9 shows a perspective view of the first structural part, the stack, the second structural part, the circuit board and a further circuit board of the battery pack from FIG. 1.

Further, the battery pack 1 comprises a further circuit board 53, as illustrated in FIG. 9. The further circuit board 53 is disposed on the tab side, in particular front side, 20V farther remote from the stack 20 than the circuit board 52, in particular with a further board plane 53E in parallel to the tab side 20V.

The further circuit board 53 is wider than the tab columns 22*a*, 22*b*.

In addition, the further circuit board 53 holds power electronics 56. The power electronics 56 are configured for controlling the output of the driving power AL from the battery pack 1 and/or an input of charging power LL to the battery pack 1, in particular in response to the measured voltages SP.

In the exemplary embodiment shown, the width of the further circuit board 53 corresponds to, in particular is equal to, a width of the stack 20, in particular in the direction x orthogonal to the stack direction z.

Moreover, in the exemplary embodiment shown, the frame 59 and/or the circuit board 52 support/supports the further circuit board 53.

Furthermore, in the exemplary embodiment shown, the further circuit board 53, in particular the power electronics 56, is/are electrically connected to the circuit board 52, in particular the measuring electronics 55.

Moreover, in the exemplary embodiment shown, the further circuit board 53, in particular the power electronics 56, is/are electrically connected to the at least one electric power connector 29.

In particular, the circuit board 52, in particular the measuring electronics 55, is/are electrically connected via the electrical cell connectors 52*e*V" to all of the cell tabs 22, with the exception of the ground (GND) cell tabs 22-0. cell potential—and the nominal voltage (NSP) cell tab 22 of the battery pack 1-10. cell potential. The circuit board 52, in particular the measuring electronics 55, is/are electrically connected to the ground cell tab 22 and the nominal voltage NSP cell tab 22 via the electrical power connectors 29 and the further circuit board 53. In alternative embodiments, the circuit board, in particular the measuring electronics, can be electrically connected to the ground cell tab and/or the nominal voltage cell tab, in particular in each case, via an electrical cell connector.

Figure 11:
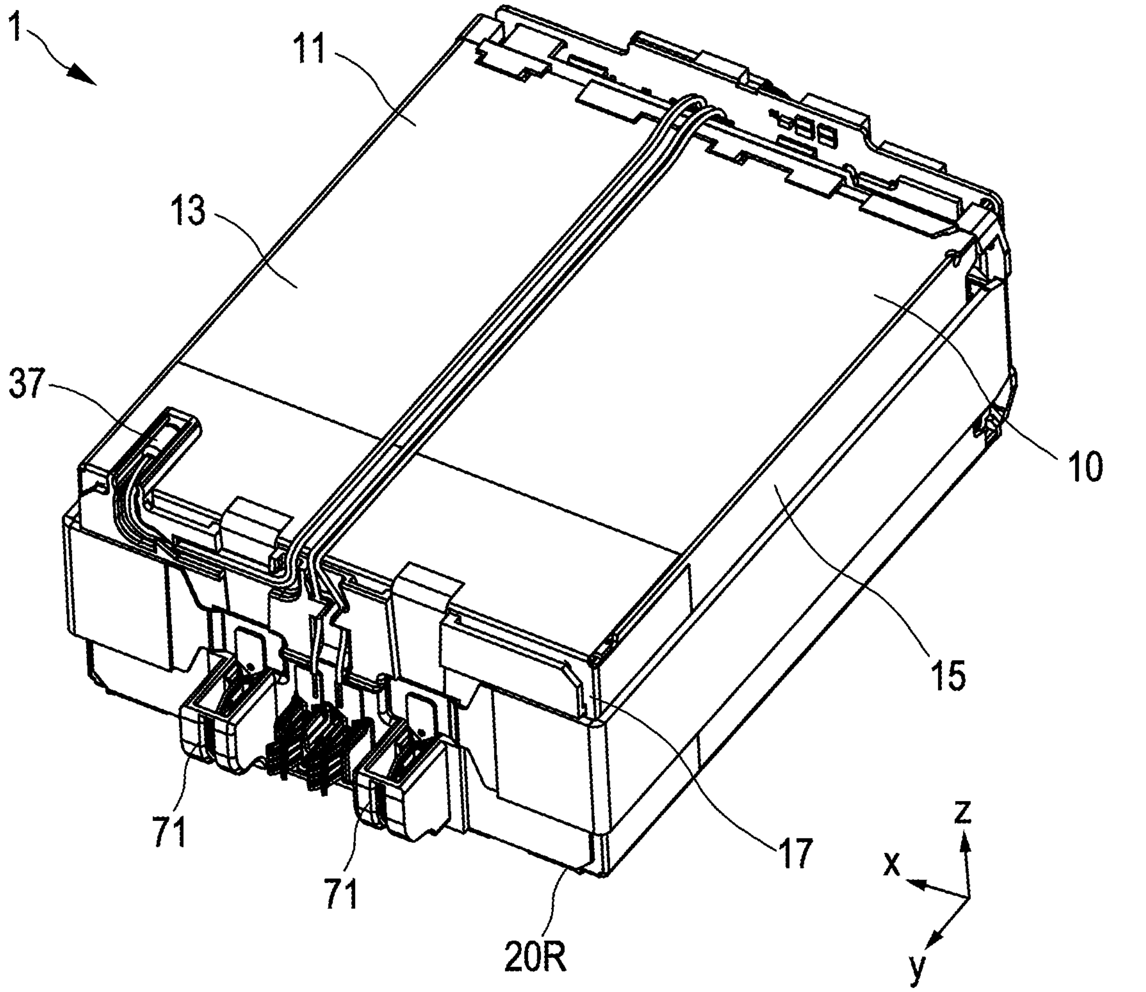
FIG. 11 shows a perspective view of a rear side of the first structural part, the stack, the second structural part, the circuit board, the further circuit board, the yet another further circuit board and an outer temperature sensor of the battery pack from FIG. 1.

Further, in the exemplary embodiment shown, the battery pack 1 comprises a plurality of battery pack contacts 71, as illustrated in FIG. 11. The battery pack contacts 71 are configured for electrical connection of the battery pack 1 and the treatment apparatus 101 to each other for supplying the treatment apparatus 101 with electric driving power AL from the battery pack 1. Additionally, the further circuit board 53, in particular the power electronics 56, is/are electrically connected to the battery pack contacts 71.

In particular, the battery pack contacts 71 are disposed on a rear side 20R of the stack 20 opposite the tab side, in particular front side, 20V of the stack 20, in particular on the stack limiting structure 10, in particular on the structure or housing wall or rear side wall 17.

Figure 10:
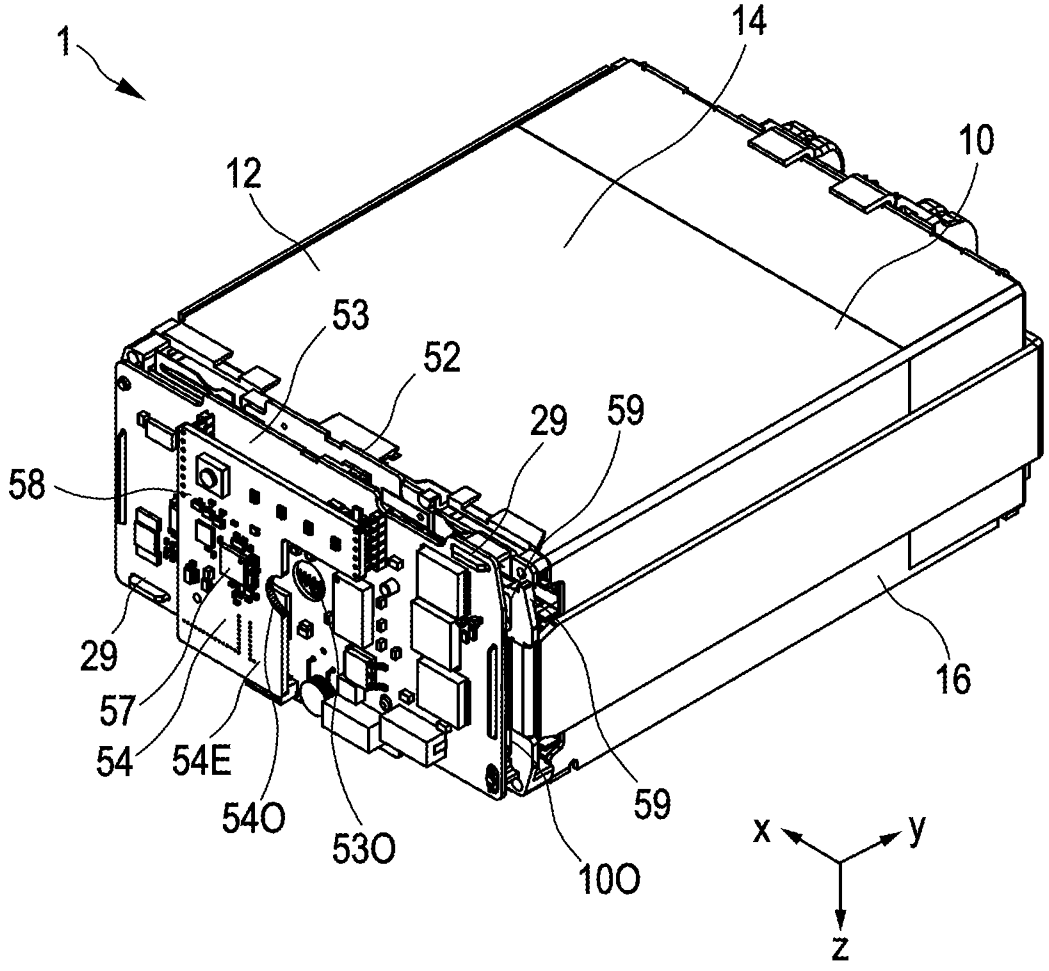
FIG. 10 shows a perspective view of the first structural part, the stack, the second structural part, the circuit board, the further circuit board and yet another further circuit board of the battery pack from FIG. 1.

Furthermore, the battery pack 1 comprises a further circuit board 54, in particular yet another further circuit board 54, as illustrated in FIG. 10. The further circuit board 54, in particular yet another further circuit board 54, is disposed on the tab side, in particular front side, 20V farther remote from the stack 20 than the circuit board 52, and in particular than the further circuit board 53, in particular with a further board plane, in particular yet another further board plane, 54E parallel to the tab side 20V. The further circuit board 54, in particular yet another further circuit board 54, holds user interface electronics 57 and transmission electronics 58. The user interface electronics 57 are configured for interaction with a user. The transmission electronics 58 are configured for wireless transmission of at least one operating parameter and/or operating condition.

In the exemplary embodiment shown, the interface electronics 57 are configured for output, in particular display, of a charging condition of the battery pack 1.

Moreover, in the exemplary embodiment shown, the further circuit board 53 supports the further circuit board 54, in particular yet another further circuit board 54.

Further, in the exemplary embodiment shown, the further circuit board 54, in particular yet another further circuit board 54, in particular the user interface electronics 57 and the transmission electronics 58, are electrically connected to the circuit board 52, in particular the measuring electronics 55, and/or the further circuit board 53, in particular the power electronics 56.

Figure 14:
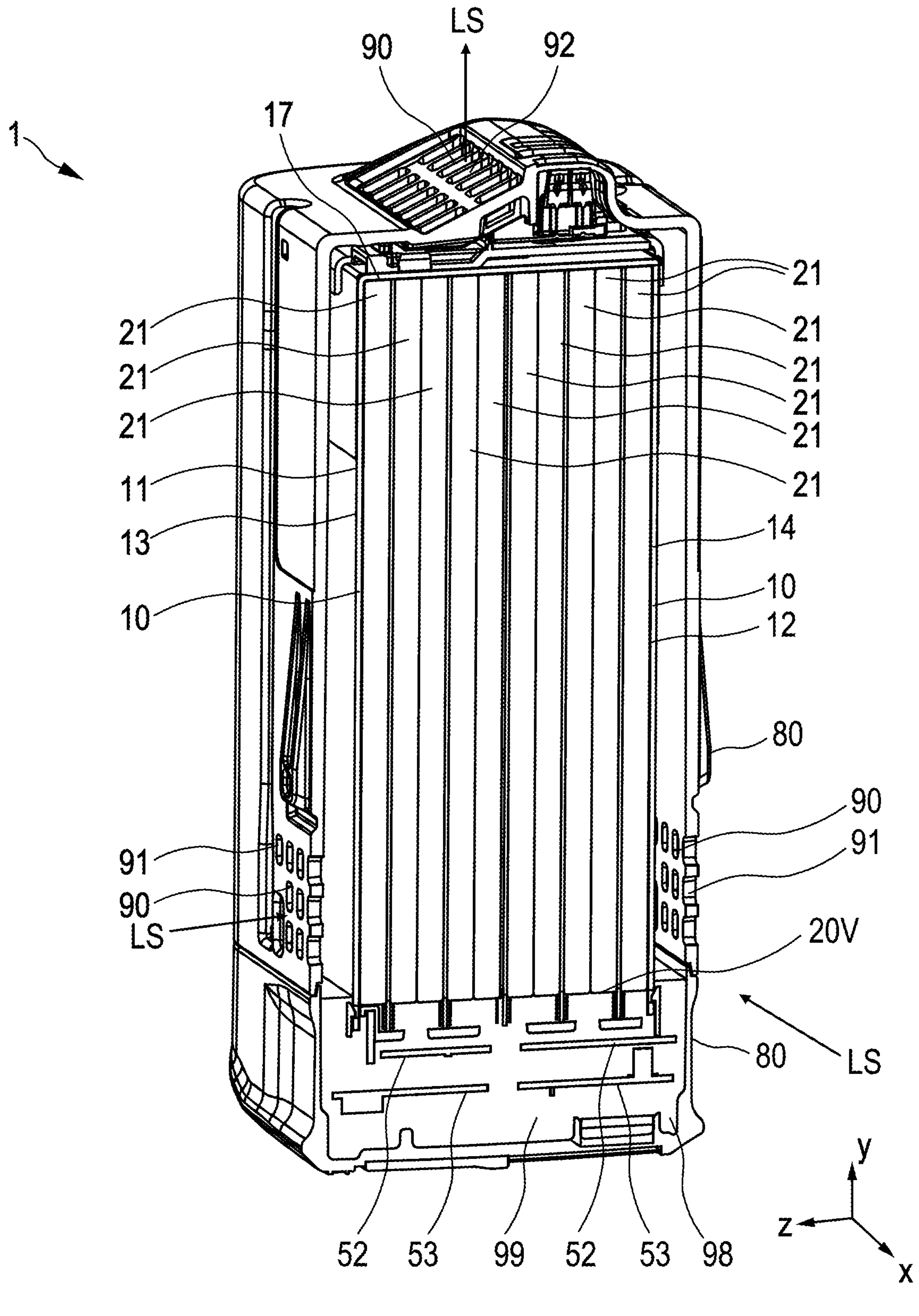
FIG. 14 shows a sectional view of the battery pack from FIG. 1 comprising casting compound.

Additionally, the circuit board 52, and in particular the at least one further circuit board 53, 54 has, in particular in each case, include a recess 52O, 53O, 54O, in particular a through hole. The recess 52O, 53O, 54O is configured for passing through a sensor line 30L, for a flow of casting compound 99, as illustrated in FIG. 14, and/or for positioning the circuit board 52, in particular the circuit boards 52, 53, 54 in relation to each other.

Figure 4:
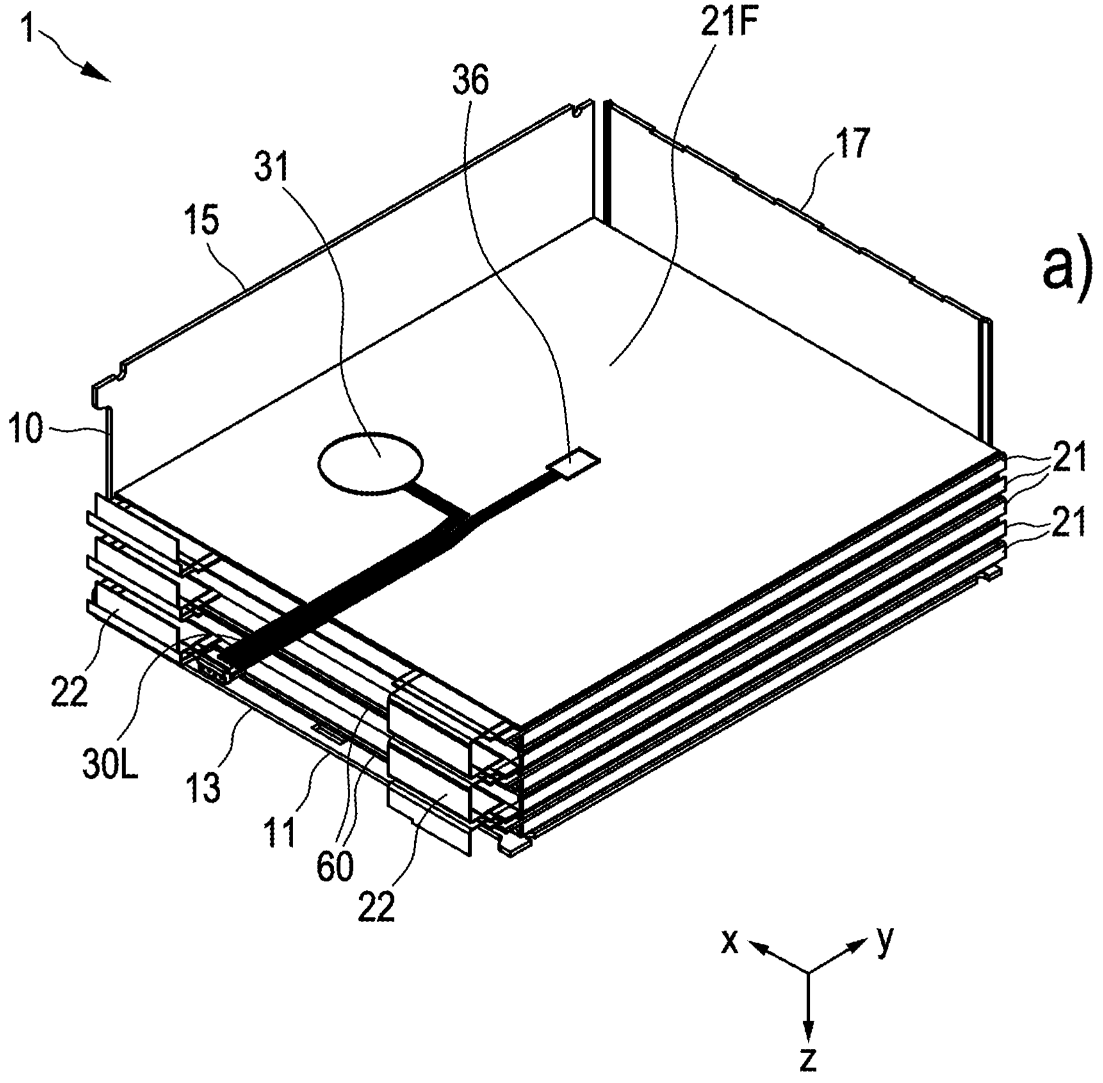
FIG. 4 shows a perspective view of the first structural part, of pouch cells, a pressure sensor and an inner temperature sensor of the battery pack from FIG. 1 and a method.

In the exemplary embodiment shown, the battery pack 1 has a pressure sensor 31, as illustrated in FIG. 4. The pressure sensor 31 is configured for detecting, in particular measuring, a pressure force acting in the stack direction z on the pouch cells 21. Furthermore, the battery pack 1 has an inner temperature sensor 36. The inner temperature sensor 36 is configured for measuring an inner temperature of the stack 20. The sensor line 30L is from the pressure sensor 31 and the inner temperature sensor 36. The circuit board 52, in particular the measuring electronics 55, is/are electrically connected to the pressure sensor 31 and the inner temperature sensor 36 by means of the sensor line 30L.

Figure 12:
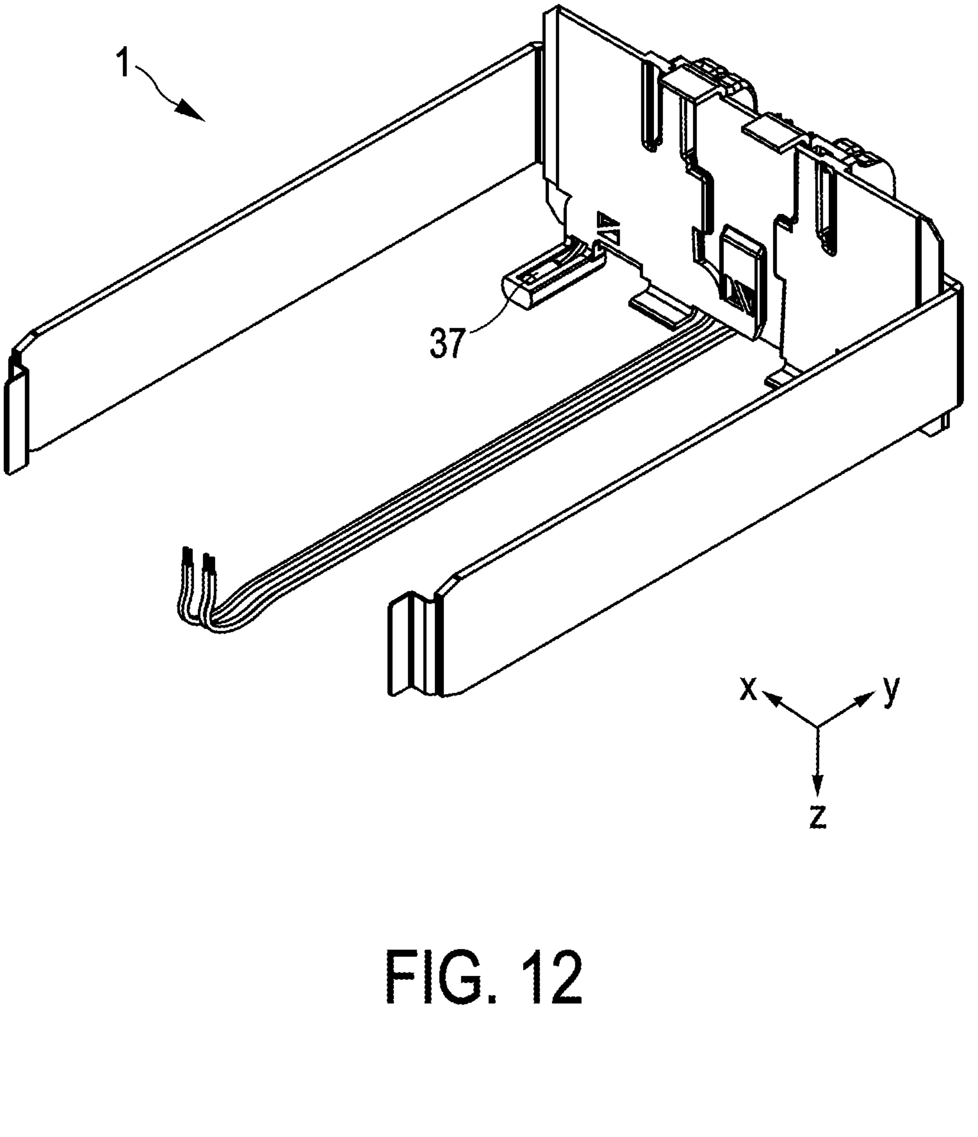
FIG. 12 shows a perspective view of the outer temperature sensor of the battery pack from FIG. 1.

Furthermore, in the exemplary embodiment shown, the battery pack 1 has an outer temperature sensor 37, as illustrated in FIGS. 11 and 12. The outer temperature sensor 37 is configured for measuring an outer temperature of the stack 20. The circuit board 52, in particular the measuring electronics 55, is/are electrically connected to the temperature sensor 37.

Moreover, in the exemplary embodiment shown, the power electronics 56 are configured for controlling the output of driving power AL from the battery pack 1 and/or an input of charging power LL to the battery pack 1 in response to the detected, in particular measured, pressure force, the measured inner temperature and the measured outer temperature.

Further, in the exemplary embodiment shown, the cell tabs 22 and the at least one circuit board 52, 53, 54 are enclosed by the, in particular thermally conductive, casting compound 99, in particular in a common casting block 98. The casting compound 99 reaches up to the outer shells of the pouch cells 21.

Figure 13:
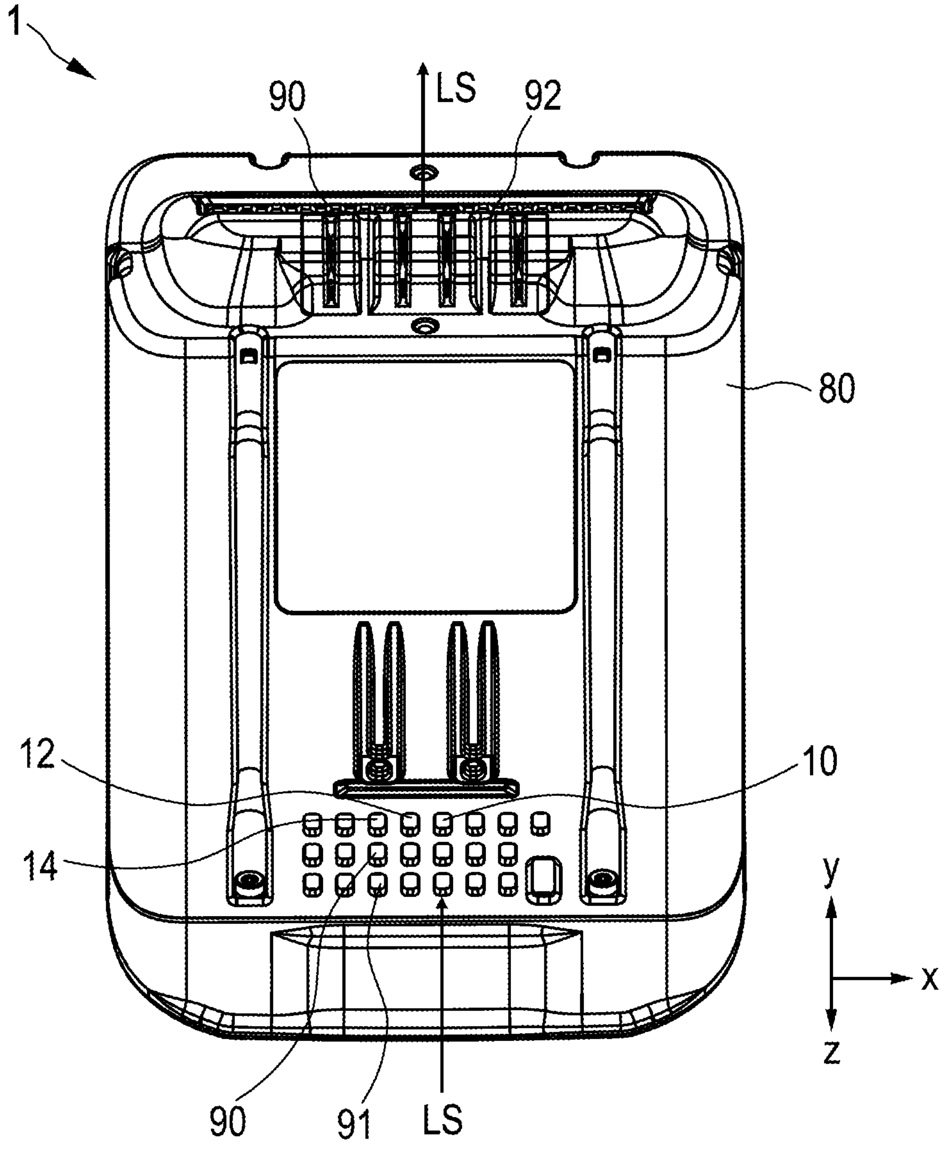
FIG. 13 shows a perspective view of a battery pack housing of the battery pack from FIG. 1.

Moreover, in the exemplary embodiment shown, the battery pack 1 comprises a battery pack housing 80, as illustrated in FIGS. 13 and 14. The pouch cells 21, and in particular the circuit board 52, the measuring electronics 55, the electrical cell connectors 52*e*V", the at least one electric power connector 29, the stack limiting structure 10, the frame 59, the further circuit board 53, the power electronics 56, the further circuit board 54, in particular the yet another further circuit board 54, the user interface electronics 57, the transmission electronics 58, the pressure sensor 31, the inner temperature sensor 36, the outer temperature sensor 37, and the casting compound 99 are disposed within the battery pack housing 80.

In particular, the battery pack housing 80 is configured as a mold for the casting compound 99.

Furthermore, in the exemplary embodiment shown, the battery pack 1 comprises at least one air cooling circuit 90 including a number of air inlet openings 91 and a number of air outlet openings 92 in the battery pack housing 80 for a cooling air flow LS passing from the number of air inlet openings 91 on the pouch cells 21, in particular the stack limiting structure 10, to the number of air outlet openings 92 for cooling the pouch cells 21. The outer temperature sensor 37 is disposed in the cooling circuit 90 between the number of air inlet openings 91 and the number of air outlet openings 92, in particular facing the number of air inlet openings 91 and/or the number of air outlet openings 92.

Moreover, in the exemplary embodiment shown, the stack limiting structure 10 has a thermal connection to the pouch cells 21 and is thermally conductive.

In particular, the stack limiting structure 10 or the stack housing 10 makes physical contact, in particular the structure or housing walls 13, 14, 15, 16, 17 make physical contact, to the pouch cells 21, and heat-conducting paste is provided between the pouch cells 21 and the structure or housing walls 15, 16, 17.

Further, in the exemplary embodiment shown, the battery pack 1 comprises at least one compensation element 60, in particular a foamed material, as illustrated in FIGS. 4 to 6. The at least one compensation element 60 is disposed in the stack 20. The at least one compensation element 60 extends across a major part of a surface 21F of the pouch cells 21 and is configured, across a compensation thickness 60D of the at least one compensation element 60, to adapt, in particular to match, the height 20H of the stack 20 to the distance 10A, in particular fixed distance 10A, between the first structure or housing wall 13 and the second structure or housing wall 14, and in particular to buffer inflating, where present, of the pouch cells 21 in the stack direction z.

In the exemplary embodiment shown, the battery pack 1 includes five compensation elements 60. In alternative exemplary embodiments, the battery pack can include only one single compensation element.

Particularly, two of the pouch cells 21 are disposed between in each case two of the compensation elements 60. This allows, that the cell tabs 22 can be equal, in particular the tab parts 22 in the stack direction z can have the same length.

Additionally, in the exemplary embodiment shown, the at least one compensation element 60 extends in the directions x, y orthogonal to the stack direction z. Furthermore, in the exemplary embodiment shown, the at least one compensation element 60 extends across the complete surface 21F of the pouch cells 21.

In addition, in the exemplary embodiment shown, the at least one compensation element 60 is a thermal insulation.

Moreover, in the exemplary embodiment shown, the battery pack 1 has a maximum electric driving power MAL of 3 kW. In alternative exemplary embodiments, the battery pack can have a maximum electric driving power of a minimum of 1 kW and/or a maximum of 10 kW.

Additionally, in the exemplary embodiment shown, the battery pack 1 has nominal voltage NSP of 36 V. In alternative exemplary embodiments, the battery pack can have a nominal voltage of a minimum of 10 V and/or a maximum of 100 V.

Additionally, in the exemplary embodiment shown, the battery pack 1 has a maximum energy content MEI of 337 Wh. In alternative exemplary embodiments, the battery pack can have a maximum energy content of a minimum of 100 Wh and/or a maximum of 1000 Wh.

Additionally, in the exemplary embodiment shown, the battery pack 1 has a mass ml of 2 kg. In alternative exemplary embodiments, the battery pack can have a mass of a minimum of 0.5 kg and/or a maximum of 10 kg.

Additionally, in the exemplary embodiment shown, the battery pack 1 has a height 1H, in particular in the stack direction z, of 5 cm, a width 1B, in particular in the direction x, of 10 cm, and a depth 1T, in particular in the direction y, of 15 cm. In alternative exemplary embodiments, the battery pack can have a height of a minimum of 2.5 cm and/or of a maximum of 10 cm, and/or a width of a minimum of 5 cm and/or of a maximum of 20 cm, and/or a depth of a minimum of 7.5 cm and/or of a maximum of 30 cm.

Figure 1:
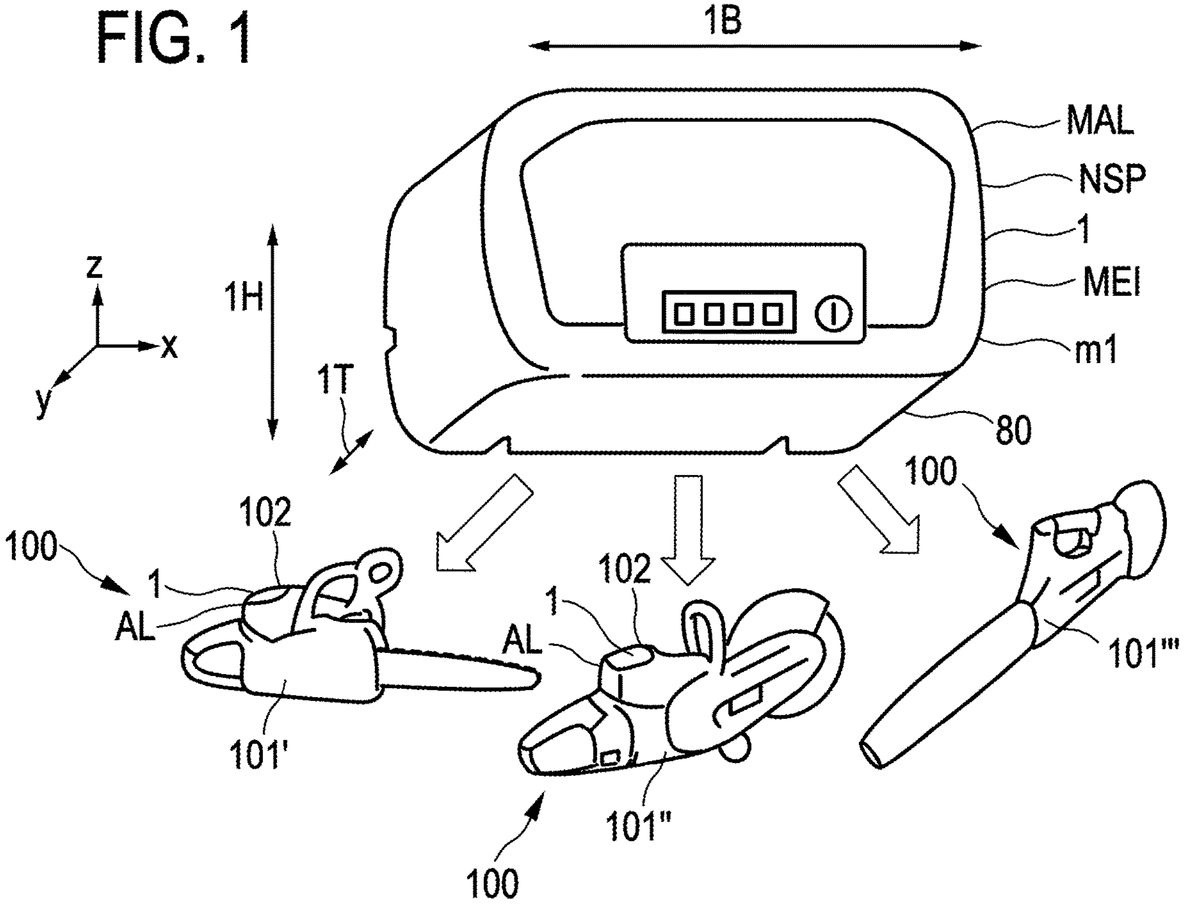
FIG. 1 shows a perspective view of a treatment system including a battery pack and an electrically driven treatment apparatus in the form of a saw, a cutoff grinder and a blower device.
Figure 2:
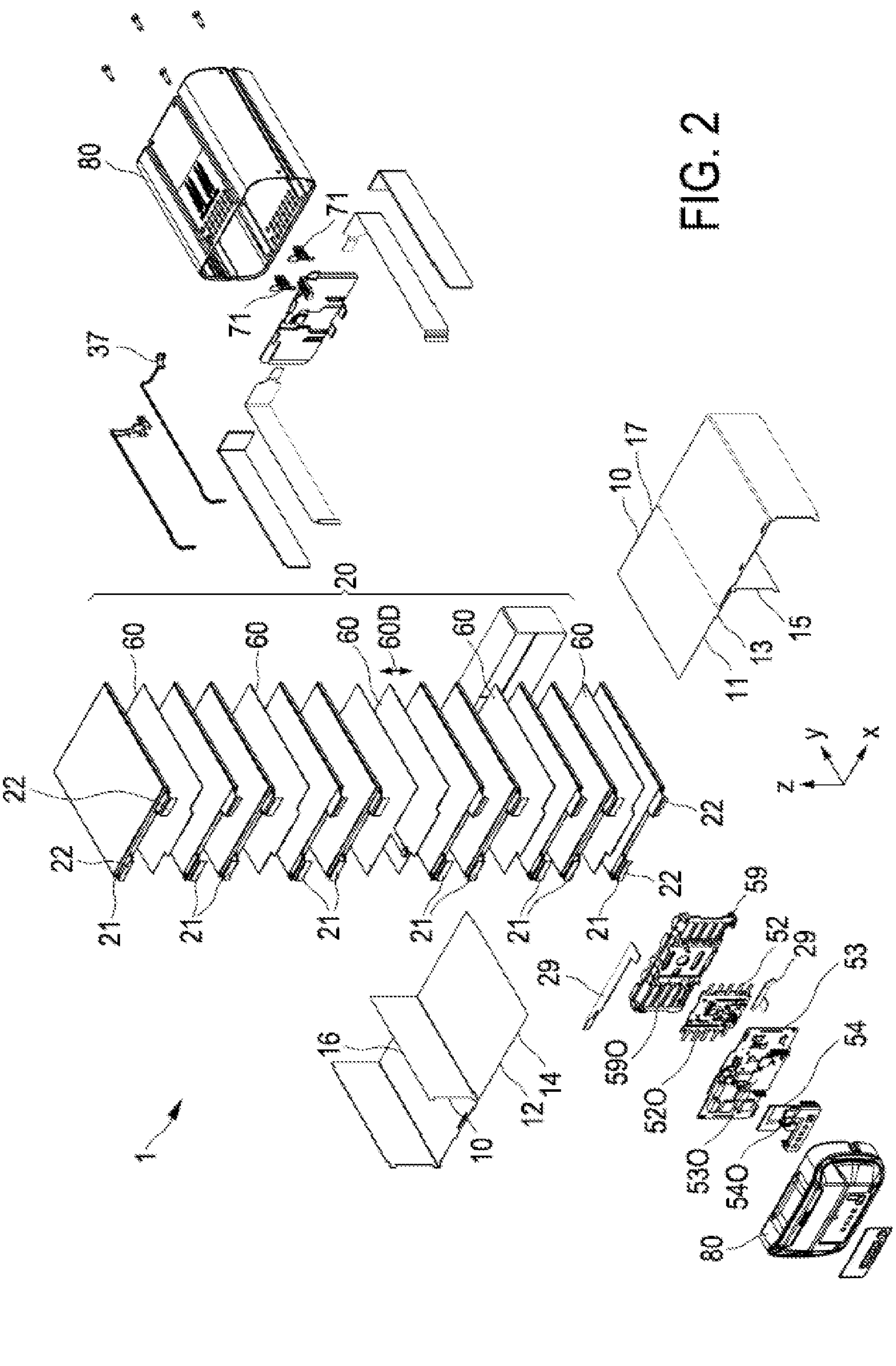
FIG. 2 shows an exploded view of the battery pack from FIG. 1.

FIG. 1 shows a treatment system 100. The treatment system 100 comprises the battery pack 1 and an electrically driven treatment apparatus 101. The battery pack 1 and the treatment apparatus 101 are configured for electrical connection with each other for supplying the treatment apparatus 101 with electric driving power AL from the battery pack 1, in particular are electrically connected.

In detail, the treatment apparatus 101 has a battery accommodation 102. The battery accommodation 102 is configured for accommodating the battery pack 1. In particular, the battery pack 1 is accommodated.

In the illustration of FIG. 1, the electrically driven treatment apparatus 101 is a saw 101', a cutoff grinder 101", or a blower device 101'". In alternative exemplary embodiments, the treatment apparatus can be a pole pruner, a clearing saw, a brush cutter, hedge shears, a hedge cutter, a leaf blower, a lopper, a sweeper device, a sweeper roller, a sweeper brush, a lawn mower, a dethatcher, or a grass trimmer.

As is made clear by the illustrated and above explained exemplary embodiments, the invention provides a battery pack for supplying an electrically driven treatment apparatus with electric driving power, a treatment system including such a battery pack and an electrically driven treatment apparatus, and a method for the production of a battery pack for supplying an electrically driven treatment apparatus with electric driving power, wherein the battery pack and the method each have improved properties.

What is claimed is:

1. A battery pack for supplying an electrically driven treatment apparatus with an electric driving power, the battery pack comprising:

a plurality of pouch cells, wherein the pouch cells have cell tabs and are configured and disposed in a stack such that the cell tabs are disposed on a common tab side of the stack in two tab columns, wherein averted end limits of the tab columns define an intermediate zone;

a circuit board, wherein the circuit board is disposed only between the two tab columns within the intermediate zone and is electrically connected to the cell tabs;

a further circuit board, wherein the further circuit board is disposed on the tab side farther remote from the stack than the circuit board and is wider than a distance from a side of a first one of the two tab columns facing away from a second one of the two tab columns to a side of the second one of the two tab columns facing away from the first one of the two tab columns, such that the further circuit board covers both of the two tab columns; and a yet further circuit board, wherein the yet further circuit board is disposed on the tab side farther remote from the stack than the circuit board and the further circuit board;

a thermally conductive casting compound enclosing the cell tabs, the circuit board, the further circuit board and the yet further circuit board in a common casting block, wherein the casting compound extends only up to outer shells of the plurality of pouch cells at a front side of the stack, the circuit board holds measuring electronics configured for measuring voltages of the pouch cells, the further circuit board holds power electronics, wherein the power electronics are configured for controlling the output of the driving power from the battery pack and/or an input of charging power to the battery pack, a low side of the further circuit board is disposed at the first one of the two tab columns and a high side of the further circuit board is disposed at the second one of the two tab columns, the yet further circuit board holds a user interface electronics display configured for display of a charging condition of the battery pack to a user, the circuit board is electrically connected to a number of the cell tabs by material-bonding engagement by way of electrical cell connectors, the electrical cell connectors are disposed farther remote from the stack or outer shells of the pouch cells than the circuit board and project beyond a board edge of the circuit board in the direction of at least one of the end limits of the two tab columns, the electrical cell connectors are inflexible and mechanically connected at a respective end to the circuit board before the circuit board is arranged within the intermediate zone, and the cell tabs of adjacent pouch cells are electrically connected to each other by a material-bonding engagement.

2. The battery pack according to claim 1, wherein the circuit board with a board plane is disposed in parallel to the tab side, wherein a board plane corresponds to a tab plane defined by the tab columns.

3. The battery pack according to claim 1, wherein electrical connections between the circuit board and a number of the cell tabs are identical.

4. The battery pack according to claim 1, wherein at least one of:

the battery pack has a stack limiting structure, wherein the stack limiting structure has a first structural part and a second structural part, wherein the stack is disposed between the first structural part and the second structural part, wherein the first structural part and the second structural part are mechanically connected to each other by at least one material-bonding engagement, and the battery pack has at least one electric power connector, wherein the electric power connector is electrically connected to one of the cell tabs by a material-bonding engagement.

5. The battery pack according to claim 1, the battery pack further comprising at least one of:

a stack limiting structure, wherein the stack limiting structure has a structure opening defined by a structure edge, wherein the pouch cells are configured and disposed in the stack within the stack limiting structure such that the cell tabs at least with tab parts on the structure opening project beyond at least one edge portion of the structure edge, wherein the circuit board is electrically connected to the tab parts, and a stack limiting structure including a structure opening, wherein the stack is disposed within the stack limiting structure, and wherein the cell tabs are disposed on the structure opening, and a frame, wherein the frame supports the circuit board and is disposed on the structure opening, wherein the cell tabs and the circuit board are positioned in relation to each other by way of the stack limiting structure and the frame.

6. The battery pack according to claim 1, wherein the circuit board has a recess, and the recess is configured for passing through a sensor line, a flow of casting compound and/or for positioning the circuit board.

7. The battery pack according to claim 1, wherein at least one of:

the battery pack has a maximum electric driving power of a minimum of 1 kW and/or of a maximum of 10 kW, the battery pack has a nominal voltage of a minimum of 10 V and/or of a maximum of 100 V, the battery pack has a maximum energy content of a minimum of 100 Wh and/or of a maximum of 1000 Wh, the battery pack has a mass of a minimum of 0.5 kg and/or of a maximum of 10 kg, and the battery pack has a height of a minimum of 2.5 cm and/or of a maximum of 10 cm, a widthof a minimum of 5 cm and/or of a maximum of 20 cm, and a depth of a minimum of 7.5 cm and/or of a maximum of 30 cm.

8. A treatment system, comprising:

a battery pack according to claim 1; and an electrically driven treatment apparatus, wherein the battery pack and the treatment apparatus are configured for electrical connection with each other for supplying the treatment apparatus with electric driving power from the battery pack.

9. The battery pack according to claim 1, wherein the yet further circuit board holds transmission electronics configured for wireless transmission of one or both of an operating parameter and an operating condition.

10. A method for producing a battery pack for supplying an electrically driven treatment apparatus with electric driving power, the method comprising the steps of:

a) disposing a plurality of pouch cells in a stack, wherein the pouch cells have cell tabs and are configured such that the cell tabs are disposed on a common tab side of the stack in two tab columns, wherein averted end limits of the tab columns define an intermediate zone;

b) mechanically connecting inflexible electrical cell connectors at a respective end to a circuit board;

c) disposing the circuit board only between the two tab columns within the intermediate zone;

d) electrically connecting the circuit board to the cell tabs by way of the electrical cell connectors, the electrical cell connectors being disposed farther remote from the stack or outer shells of the pouch cells than the circuit board and project beyond a board edge of the circuit board in the direction of at least one of the end limits of the two tab columns; and e) disposing a further circuit board on the tab side farther remote from the stack than the circuit board and a yet further circuit board disposed on the tab side farther remote from the stack than the circuit board and the further circuit board;

f) enclosing the cell tabs, the circuit board, the further circuit board and the yet further circuit board with a thermally conductive casting compound in a common casting block, wherein the casting compound extends only up to outer shells of the plurality of pouch cells at a front side of the stack, wherein the circuit board holds measuring electronics configured for measuring voltages of the pouch cells, and the further circuit board holds power electronics, wherein the power electronics are configured for controlling the output of the driving power from the battery pack and/or an input of charging power to the battery pack, a low side of the further circuit board is disposed at a first one of the two tab columns and a high side of the further circuit board is disposed at a second one of the two tab columns, the further circuit board is wider than a distance from a side of the first one of the two tab columns facing away from the second one of the two tab columns to a side of the second one of the two tab columns facing away from the first one of the two tab columns, such that the further circuit board covers both of the two tab columns, and the yet further circuit board holds a user interface electronics display configured for display of a charging condition of the battery pack to a user, wherein the step c) is performed in time after steps a) and b); and the step d) is performed in time after step c) and comprises:

material-bonding engagement of the circuit board to a number of the cell tabs for electrical connection of the circuit board to the cell tabs and material-bonding engagement of the cell tabs of adjacent pouch cells for electrical connection of the cell tabs of adjacent pouch cells to each other.

11. The method according to claim 10, wherein the yet further circuit board holds transmission electronics configured for wireless transmission of one or both of an operating parameter and an operating condition.

* * * * *